Nov. 8, 1938.    F. H. EWERHARDT    2,136,207
ARTICULATED POSTURE MANIKIN
Filed June 11, 1937    2 Sheets-Sheet 1

INVENTOR
FRANK H. EWERHARDT
BY: Ben V. Zillman
ATTORNEY

Nov. 8, 1938.  F. H. EWERHARDT  2,136,207
ARTICULATED POSTURE MANIKIN
Filed June 11, 1937  2 Sheets-Sheet 2

INVENTOR
FRANK H. EWERHARDT
BY Ben V. Zillman
ATTORNEY

Patented Nov. 8, 1938

2,136,207

UNITED STATES PATENT OFFICE 2,136,207

ARTICULATED POSTURE MANIKIN

Frank H. Ewerhardt, St. Louis, Mo.

Application June 11, 1937, Serial No. 147,609

2 Claims. (Cl. 35—29)

This invention relates broadly to educational devices, and more particularly to a manikin depicting the human figure, and so articulated that it may be actuated into incorrect as well as into correct posture positions.

One of the objects of this invention is to provide means for continuously actuating the manikin into said postures as an entirety, so that manual manipulation of the various component parts of the manikin are not required; hence, enabling the manikin to be used as an educational device, to teach the overcoming of faulty posture by permitting the observers to visualize just how the human figure appears in good and bad postures.

Another object of this invention is to provide means for mechanically actuating said manikin in a predetermined manner, alternately and successively into correct and incorrect postures, and to provide means for controlling the speed of this movement.

A further object of my invention is to provide signal means associated with the manikin and operable at the correct and the incorrect posture positions to more firmly emphasize these positions.

A still further object of the invention is to provide a manikin so proportioned and so articulated that the pelvic portion thereof moves in a manner approximately like that of a human being, namely substantially rotates about a center intermediate the front and rear of the body.

Added objects of the invention include the production of an educational device of the kind described, which will be neat and attractive in appearance, simple in construction and operation, relatively light in weight so that it may be easily portable, and otherwise satisfactory and efficient for use wherever deemed applicable.

Many other objects and advantages of the construction herein shown and described will be obvious to those skilled in the art to which this invention appertains, from the disclosures herein given.

To this end, my invention consists in the novel construction, arrangement and combination of parts herein shown and described, and the uses mentioned, as will be more clearly pointed out in the claims hereunto appended.

In the drawings, wherein like reference characters indicate like or corresponding parts throughout the views, Figure 1 is a front elevation of my device;

Figure 1:
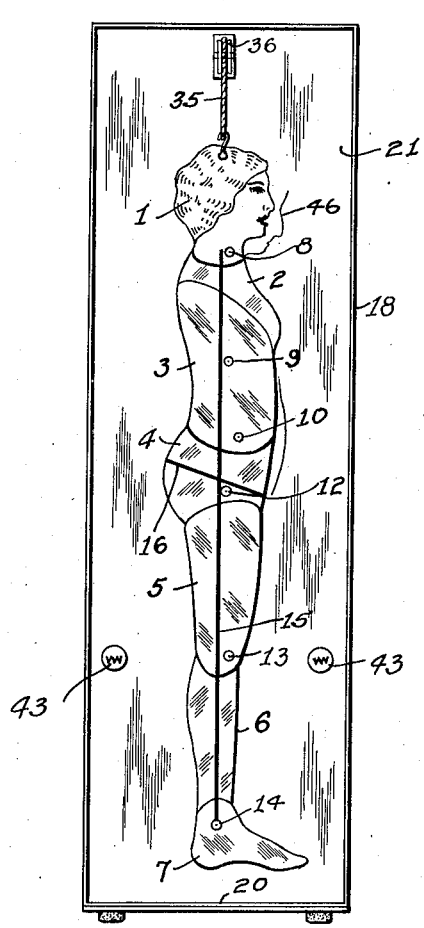

Referring more particularly to the drawings, wherein I have illustrated the preferred embodiment of my invention, there is illustrated an educational device adapted principally for the teaching and demonstrating of the manner of obtaining correct body posture, such as in schoolrooms, hospitals, etc.

The manikin shown is proportioned as closely as possible in accord with actual body measurements, and includes the head portion 1, chest portion 2, the upper body portion 3, pelvis portion 4, thigh or lower body portion 5, leg portion 6 and foot portion 7. These pieces are substantially flat plates, of any desired or suitable material, such as aluminum sheet, and said pieces may be painted or otherwise ornamented to more closely simulate the human figure, or if so desired, said pieces may be colored contrastingly in order to more clearly accentuate the various body parts.

These body pieces are articulated together so as to be movable in a manner closely simulating the movement of the body, or at least those parts of the body that are of most importance in effecting body posture. To this end, the head is pivotally connected at its neck to the upper part of the chest portion, as at 8. The chest portion is pivotally connected adjacent its lower end to the upper body portion, as at 9, this point being, however, a considerable distance below the upper edge of said body piece. The pivot 10 connects the lower part of the upper body piece 3 to the upper part of the pelvic piece 4.

An extension plate 11 is rigily fixed to project beyond the upper edge of the lower body piece 5, the same being secured to the rear of the latter so as to be normally concealed, and a pivot 12 is used to connect the upper part of said extension plate 11 to the piece 4 at a considerable distance above the lower edge of the latter. The lower part of the thigh piece 5 is pivoted at 13 to the upper part of the leg piece 6.

The lower part of the leg piece is pivoted at 14 to the foot piece, said pivot being the only one of the pivots above-mentioned that is fixed to the partition wall to be hereinafter described, all of the other pivots having a predetermined freedom of movement. Although in human beings, the foot itself pivots slightly in accordance with the body posture, yet this movement more or less takes care of itself and is of small importance as compared with the movement of the major parts of the body, and hence it was thought best not to unduly complicate the articulation of the manikin for the teaching of body posture in itself.

A vertical line 15 has been drawn through the manikin, upwardly from the pivot 14, and which in correct body posture, as shown in Fig. 1, passes through approximately the center of the neck and head. All of the pivots, except that of the pivot 14, are to the right of said line 15 in the posture shown there, but at varying distances forwardly of the body from said line, the pivots 8, 9, 12 and 13 being being relatively close to said line 15, and substantially in vertical alignment when the parts are in the positions shown in Fig. 1, but the pivot 10 is appreciably farthermost therefrom. In addition to said vertical line, another line 16 is drawn through the manikin, from front to rear of said pelvic portion, the same extending upwardly from the front of the body so as to make an angle other than a right angle with said line 15, somewhat as shown.

A housing or similar enclosure having a rear wall 17, side walls 18, a top 19 and a bottom 20, may be used to encase said device and the actuating mechanism, and thereby render the same fully portable and more attractive in appearance, and a partition wall 21 may be provided to extend across said housing intermediate the front and back of the same.

Figure 3:
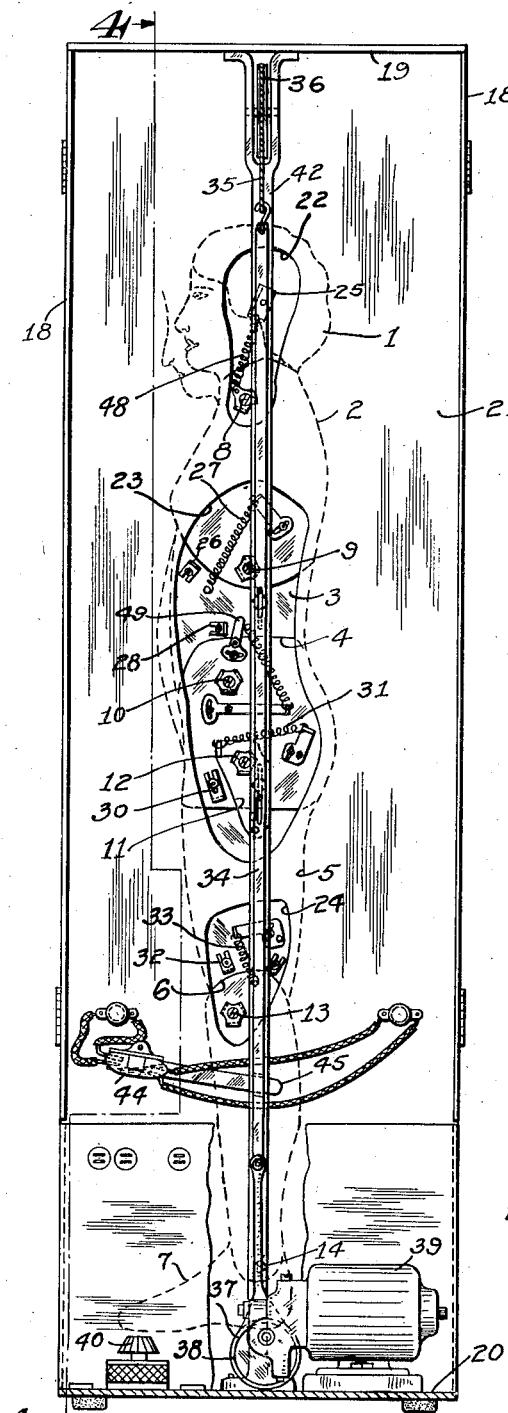
Figure 3 is an elevational view of the device, as seen from the rear, and with certain parts removed to show the parts more clearly.
Figure 4:
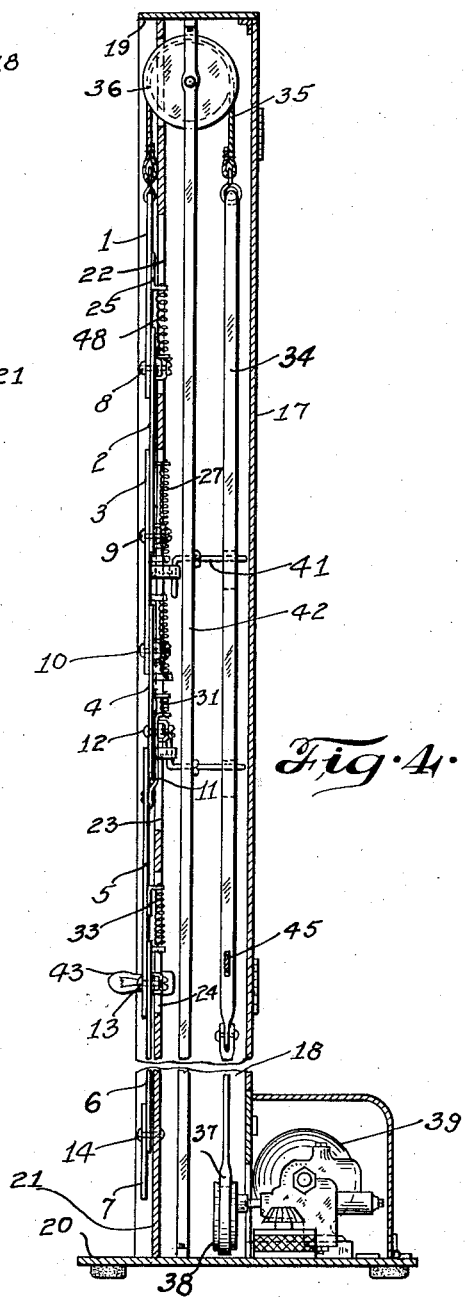
Figure 4 is a longitudinal cross-sectional view, taken substantially along the line 4—4 of Fig. 3.

As indicated more clearly in Figs. 3 and 4, said partition may be provided with cut-outs or openings at predetermined areas thereof, as indicated at 22, 23 and 24, said openings not only serving to provide access to the rear of the manikin portions, for adjustment, replacement, or otherwise, but also serving as stops to limit the movement of said portions during the operation of the mechanism.

Figure 2:
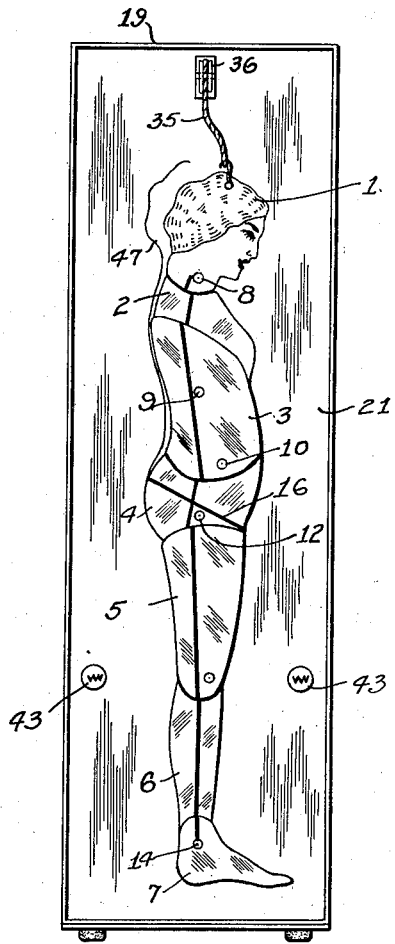
Figure 2 is a similar view, illustrating the manikin in a different position.

An abutment or stop 25 is carried by said head piece 1, above said pivot 8 and slightly rearwardly of the latter (toward the rear of the body), and a tension spring 26 connects said stop to said pivot 8, or approximately to said pivot 8, so that when there is no force exerting an upward pull, said spring will pull the head into the position shown in Fig. 2, swinging the head about said pivot until the stop 25 abuts an edge of said opening 22 (see Figs. 3 and 4). In a similar manner, a stop 26 carried on the rear of the piece 3 will abut the lower edge of said chest piece whenever the spring 27 shown as connecting said pieces is strong enough to rotate the chest about the pivot 9.

A second stop 28 is carried at the rear of said body piece 3, for abutment with a stop 49 carried by the upper edge of said pelvic piece 4, the spring 29 determining the direction of movement of rotation of said pelvic piece. A stop 30 is carried at the lower edge of said pelvic piece for abutment with an edge of the opening 23, when the spring 31 between said extension plate 11 and said pelvic piece is permitted to act.

In a similar manner, the stop 32 carried at the rear of the lower body piece 5 will abut against the edge of the opening 24 when the spring action permit the spring 33 connecting the piece 5 and leg piece 6 to function positively.

When there is no pull to hold the parts upwardly in the position shown in Fig. 1, and which position we call the correct normal standing posture position, wherein the vertical line 15 is truly vertical, the springs will be free to exert their pulls to rotate the pieces of the manikin so that the latter will assume the position shown in Fig. 2, and which is termed the normally incorrect posture position, and in which position the line 15 is thrown out of vertical alignment.

In order to enable the device to be more effectively used as a teaching mechanism, it is important, not only that the parts always assume the desired positions each time in the operation of the device to the two respective posture positions, but that the instructor be relieved of the manual manipulation of the manikin pieces and devote himself to the instruction itself. For this reason, as well as others, the mechanism is so constructed that there is a positive actuation of the parts, to continuously actuate the manikin successively and alternately into correct and into incorrect postures.

To effect this purpose, a rod 34 extends upright in said housing behind said partition, a cable 35 connecting the upper end of the same to the upper edge of the head piece of the manikin, approximately in alignment with the line 15 extended (in correct posture position), and passing over a sheave 36 in the upper part of the housing. Any desired manner of alternately lifting and lowering said rod continuously, may be used, as for example, a strap 37 encircling an eccentric wheel 38, which is in turn rotatively driven by a motor 39. A rheostat 40 or similar means may be used in circuit with the motor in order to control the speed of the latter, and consequently the speed of operation of the manikin, or if so desired to stop the actuation entirely for any predetermined period.

In order to prevent the manikin pieces from dropping out of the casing entirely, or to otherwise interfere with the proper actuation of the parts, one or more pins as 41 (shown more clearly in Fig. 4) may be rotatively threaded through the pulley support 42, the forward ends connected to the adjacent manikin pieces and the rear ends slidable in slots through the rod 34.

A pull on the cable 35 will first tilt the head about its pivot 8 until the latter point and the point of securement of the cable to the head are substantially in vertical alignment, this movement being of sufficient intensity to overcome the pull of the spring 48; and continued pull on the head will swing the depending parts into the substantially vertical alignment shown, all of this being against the tension of the springs 27, 29, 31 and 33. This pull causes the pelvic portion 4 of the manikin to rotate partially about its pair of non-vertically aligned pivot points 10 and 12 until the various parts of the manikin are in substantially the position shown in Fig. 1. As soon as the cable ceases to pull, the various springs will retrieve the manikin portions to their normal positions shown in Fig. 2.

If it is desired to still further emphasize the teaching of posture, lights or other signals may be operated at various times during the operation of the automaton, as for example at the correct and the incorrect posture positions, a single light being indicated at each side of the manikin for the sake of simplicity, although it is to be understood that these are the equivalent of written phrases, inscriptions, etc., that could be controlled in a similar manner. These signal lights 43 may be controlled through a mercury switch 44 pivoted to the casing, there being an arm 45 passing through any reciprocally moving part, as through the rod 34. At the position of the arm 45 as shown in Fig. 3, the switch will close the circuit of the right-hand light there shown, but as soon as the rod moves upwardly sufficiently to shift the arm to open the right-hand circuit and immediately thereafter close the left-hand circuit, the other signal will be energized.

By the use of a mechanism such as hereinbefore set forth, one is able to fully and completely teach the overcoming of faults of incorrect posture, as the operation of the device itself is continuous and automatic and the instructor's time can be devoted entirely to instructing and not to manipulation manually of a manikin, as applicant is well aware that posture manikins that must be manually operated are not new. The pieces of the manikin will always assume the positions intended, as a complete unit, this result being mechanically obtained, and not being a hit-or-miss proposition dependent upon the skill of operation.

If desired, and in order to better enable the observer to compare certain parts of the body in correct and incorrect postures, the partition wall of the device may have inscribed thereon the figure lines 46 and 47, the same indicating the outlines of certain parts of the body at incorrect and correct postures, respectively.

It is to be noted that incorrect body posture is responsible for some of the body defects, such as sway-back, round-shoulders, protruding abdomen, sagging chests, drooping head, etc., (all indicated clearly in Fig. 2), these being of course, not mere unsightly defects, but ones actually affecting the physical well-being of the persons having them. Inspection of Fig. 1 shows that simple change in posture will correct these unsightly appearances, and tend to remedy any ailments caused through faulty posture.

One of the main objects of this invention is to show the observers of the manikin, just how the pelvic parts of the human body substantially rotate, the rotation of said piece or parts being to a greater degree than the pivoting of the other cooperating parts of the body, all of which is carried out as faithfully as possible in the operation of the manikin.

Having thus described my invention, it is obvious that various immaterial changes may be made in the same without departing from the spirit of my invention; hence I do not wish to be understood as limiting myself to the exact form, arrangement, construction and combination of parts herein shown and described, or the uses mentioned, except as limited by the state of the art to which this invention appertains, and the claims hereunto appended.

What I claim as new and desire to secure by Letters Patent is:

1. In an educational device of the kind described, a manikin secured at its lower end to a fixed support, and including upper and lower body portions and a pelvic portion therebetween, said pelvic portion being pivoted at an upper point to said upper body portion and at a lower point to said lower body portion, said pair of pivoted points being out of vertical alignment, means for actuating said upper body portion longitudinally for a predetermined distance, whereby said pelvic portion will be partially rotated about its pair of pivoted points, and means for retrieving said portions to normal positions after each actuation.

2. In a manikin of the kind described, a set of plates simulating the human body in profile and including upper and lower body plates, a pelvic plate therebetween, a chest plate above said upper body plate, a head plate above said chest plate, and a leg plate below said lower body plate, the adjacent plates being pivoted to one another with the point of pivotal securement of the upper body plate and pelvic plate farthermost laterally from a vertical line through the lower body plate pivotal securement to the pelvic plate, and said leg plate being pivoted at its lower end to a fixed support, whereby when said head plate is pulled upwardly for a predetermined distance, this pull will be transmitted through the manikin to partially rotate said pelvic plate about its pair of pivotal connections, and means for retrieving said plates to normal positions after said pull is released.

FRANK H. EWERHARDT.